(12) United States Patent
Hong et al.

(10) Patent No.: US 6,249,400 B1
(45) Date of Patent: Jun. 19, 2001

(54) RADIATION APPARATUS OF HARD DISK DRIVE

(75) Inventors: Soon-kyo Hong, Seoul; Seong-hoon Kim, Sungnam; Byoung-young Bae, Pyungtaek; Sung-jin Lee, Gwangmyung; Byeong-cheon Koh, Sungnam, all of (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/385,444

(22) Filed: Aug. 30, 1999

(30) Foreign Application Priority Data

Oct. 14, 1998 (KR) .................................................. 98- 42931

(51) Int. Cl.[7] .................................................. G11B 17/02
(52) U.S. Cl. .......................................................... 360/97.02
(58) Field of Search ............................... 360/97.02–97.04

(56) References Cited

U.S. PATENT DOCUMENTS 6,108,164 * 8/2000 Weber, Jr. .......................... 360/97.02

* cited by examiner

*Primary Examiner*—Robert S. Tupper
(74) *Attorney, Agent, or Firm*—Sughrue, Mion, Zinn, Macpeak & Seas, PLLC

(57) ABSTRACT

A radiation apparatus of a hard disk drive includes a base frame, a spindle motor installed at the base frame, a hard disk rotatably supported by a rotation shaft of the spindle motor, a cover frame coupled to the base frame and having a hole formed therein, a radiation plate installed at the cover frame and formed of a copper alloy having a thermal conductivity higher than that of the cover frame, and a portion for coupling the rotation shaft and the radiation plate so that driving heat generated by the spindle motor can be directly transferred to the radiation plate.

7 Claims, 3 Drawing Sheets

RADIATION APPARATUS OF HARD DISK DRIVE

BACKGROUND OF THE INVENTION

1. Field of the Invention

The present invention relates to a radiation apparatus of a hard disk drive which dissipates heat generated from the inside of a housing to the outside.

2. Description of the Related Art

In a general hard disk drive used as a memory storage device of a computer, as shown in FIG. 1, a hard disk 15 rotated by a spindle motor is installed in a housing 10 which is formed of a stainless steel-based material or aluminum-based material. The hard disk 15 rotates together with a rotor 13b of the spindle motor 13.

The housing 10 is installed inside a computer main body (not shown) and has a base frame 11 by which the spindle motor 13 is supported and a cover frame 12 coupled to the base frame 11 to protect the hard disk 15.

Here, a rotation shaft 13a of the spindle motor 13 fixed to the base frame 11 is directly coupled to the cover frame 12 by a screw 17 to prohibit shaking of the hard disk 15 due to centrifugal force.

A damper member 14 formed of aluminum is attached on the outer surface of the cover frame 12 using a double-sided adhesive tape 16 to dampen vibrations generated from the inside of the housing 10.

In the hard disk drive having the above structure, heat is generated due to driving of the spindle motor 13 for rotating the hard disk 15 and due to friction between the hard disk 15 and air. Thus, the temperature in the housing 10 increases in proportion to the number of rotations of the hard disk 15. However, since data recorded on the hard disk 15 may be damaged when the temperature in the housing 10 exceeds about 60° C., the heat in the housing 10 should be radiated outward. Particularly, since the heat in the housing 10 moves toward the side and upper portions of the housing 10 due to forced convection of the air generated as the hard disk 15 rotates, an effective radiation of heat at the cover frame 12 is further desirable.

However, thermal conductivity (about 15 W/mk) of the damper member 14 is lower than that (about 210 W/mk) of the housing 10. Thus, the heat in the housing 10 does not dissipate well to the outside and effective radiation of heat cannot be expected.

SUMMARY OF THE INVENTION

To solve the above problem, it is an objective of the present invention to provide an apparatus for radiating heat in a hard disk drive having an improved structure to effectively radiate heat in the housing by having a radiation plate formed of a material exhibiting a higher thermal conductivity.

Accordingly, to achieve the above objective, there is provided a radiation apparatus of a hard disk drive which comprises a base frame; a spindle motor installed at the base frame; a hard disk rotatably supported by a rotation shaft of the spindle motor; a cover frame coupled to the base frame and having an opening formed therein; a radiation plate installed at the cover frame and formed of a copper alloy having a thermal conductivity higher than that of the cover frame; and means for coupling the rotation shaft and the radiation plate so that driving heat generated by the spindle motor can be directly transferred to the radiation plate.

Here, it is preferred in the present invention that the coupling means comprises a screw which penetrates the hole and is screw-coupled to a screw hole formed at an end portion of the rotation shaft.

Also, it is preferred in the present invention that the surface of the radiation plate is coated with nickel.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 2:
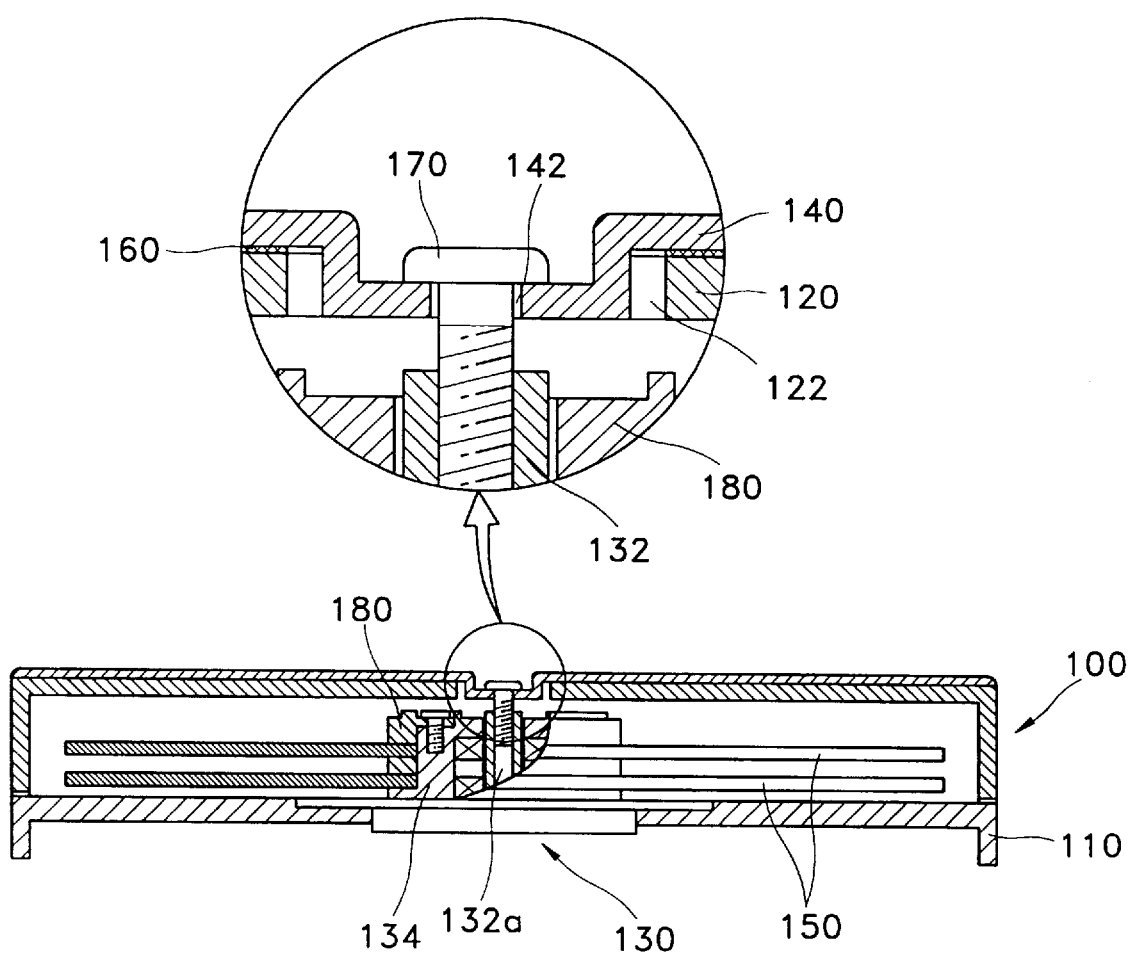
FIG. 2 is a sectional view showing a radiation apparatus of a hard disk drive according to a preferred embodiment of the present invention.

Referring to FIG. 2, a radiation apparatus of a hard disk drive according to a preferred embodiment of the present invention includes a housing 100, a hard disk 150 installed in the housing 100, a spindle motor 130 for rotating the hard disk 150, a radiation plate 140 installed at the housing 100, and a coupling means for coupling the radiation plate 140 directly to a rotation shaft 132 of the spindle motor 130.

The housing 100 is formed of stainless steel-based or aluminum-based materials and installed at a computer main body (not shown). Also, the housing 100 includes a base frame 110 by which the spindle motor 130 is supported and a cover frame 120 coupled to the base frame 110 to protect the hard disk 150 and having a hole 122 formed therein to face the rotation shaft 132 of the spindle motor 130. A rotor 134 is coupled to the rotation shaft 132 fixed to the base frame 110. A clamper 180 for clamping the hard disk 150 is coupled to the rotor 134.

The hard disk 150 is rotated by the spindle motor 130. A predetermined data recording/reproducing means (not shown) records data on the hard disk 150 or reproduces the data recorded thereon. Also, the hard disk 150 may have a multi-layered structure to increase the storage capacity.

The radiation plate 140 is attached to the outer surface of the cover frame 120 using an adhesive 160 such as an adhesive tape. The radiation plate 140 dissipates heat, generated when the spindle motor 130 rotates and generated due to friction between the rotating hard disk 150 and the air, to the outside of the housing 100. Accordingly, the radiation plate 140 is formed of a copper (Cu) based material exhibiting a higher thermal conductivity than aluminum (Al), for example, one of alloys of zinc (Zn) and copper (Cu) in a mixture ratio of 30:70, aluminum (Al) and copper (Cu) in a mixture ratio of 10:90, and tin (Sn) and copper (Cu) in a mixture ratio of 11:89.

Also, to prevent corrosion of the radiation plate 140, the surface of the radiation plate 140 is preferably coated with nickel (Ni) to a thickness of over 0.002 mm.

The coupling means directly couples the rotation shaft 132 and the radiation plate 140 so that the driving heat of the spindle motor 130 can be directly transferred to the radiation plate 140 and thus radiated. The coupling means has a screw 170 which is screw-coupled to a screw hole 132a formed on an end portion of the rotation shaft 132. The screw 170 is screw-coupled to the screw hole 132a by penetrating a coupling hole 142 formed in the radiation plate 140.

Figure 3:
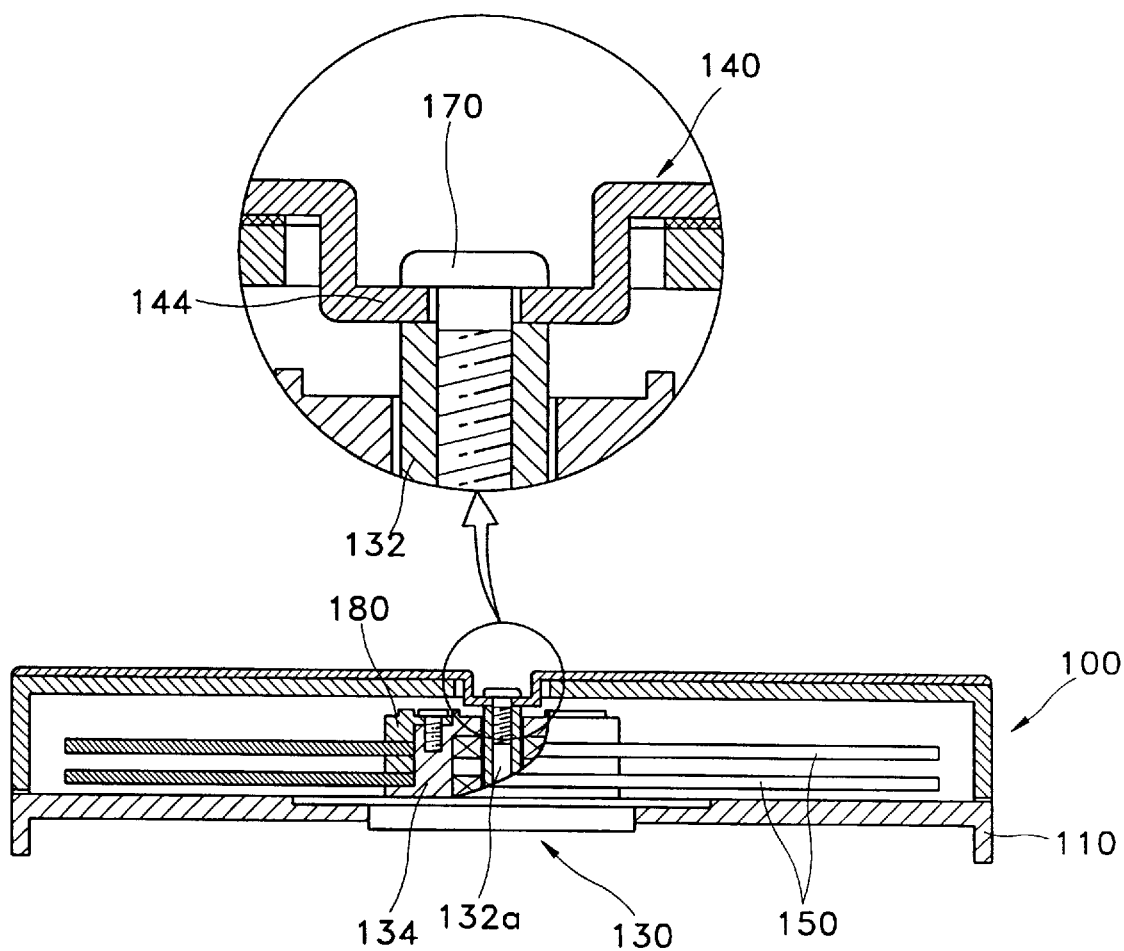
FIG. 3 is a sectional view showing a radiation apparatus of a hard disk drive according to another preferred embodiment of the present invention.

Also, as shown in FIG. 3, the radiation plate 140 has an indentation 144 formed to protrude downward to fit the hole 122 of the cover frame 120. The indentation 144 is coupled by the screw 170 such that the indentation 144 can directly contact an end portion of the rotation shaft 132. Thus, heat transfer rate from the rotation shaft 132 to the radiation plate 140 can be increased.

The operation of the radiation apparatus of a hard disk drive having the above structure according to a preferred embodiment of the present invention will be described as follows.

When the spindle motor 130 is driven to rotate the hard disk 150, a driving heat of the spindle motor 130 is generated. Most of the driving heat is transferred to the radiation plate 140 via the rotation shaft 132 and the screw 170 and dissipated to the outside. The rest of the driving heat and most of heat generated due to friction between the hard disk 150 and the air is dissipated to the outside via the cover frame 120 and the radiation plate 140 having a thermal conductivity higher than the cover frame 120. Thus, an increase in the temperature inside the housing 100 can be restricted.

Figure 4:
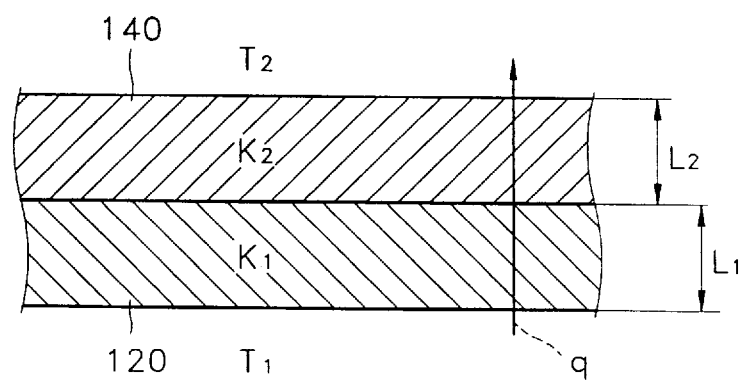
FIG. 4 is a view for explaining the operation of the radiation apparatus of a hard disk drive shown in FIG. 2.

The relationship between thermal conductivities of the cover frame 120 and the radiation plate 140 and heat transfer rate q of heat transferred from the inside of the housing 100 to the outside is explained with reference to FIG. 4 and the below Equation 1.

$$q = \frac{T_1 - T_2}{R_{tot}} \left( R_{tot} = \frac{L_1}{k_1 A} + \frac{L_2}{k_2 A} \right) \quad \text{[Equation 1]}$$

Here, q is the heat transfer rate; $T_1$ and $T_2$ are temperatures of an inner surface of the cover frame and an outer surface of the radiation plate; $L_1$ and $L_2$ are thicknesses of the cover frame and the radiation plate; $k_1$ and $k_2$ are thermal conductivities (W/mk) of the cover frame and the radiation plate; and $R_{tot}$ is the thermal resistance.

Figure 1:
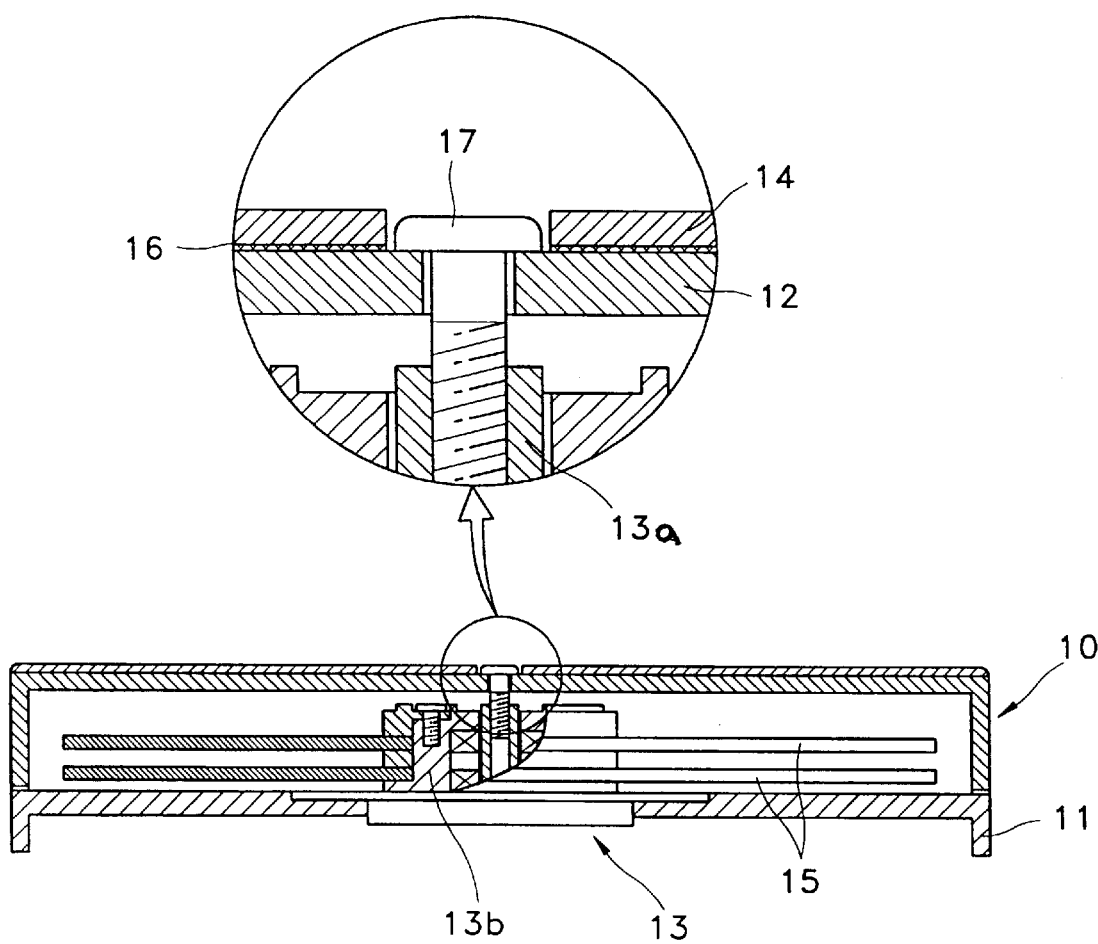
FIG. 1 is a sectional view of a general hard disk drive.

According to the above equation, it can be seen that the heat transfer rate q increases as the thermal resistance $R_{tot}$ decreases. Thus, to reduce the thermal resistance $R_{tot}$, it is preferred that the thicknesses $L_1$ and $L_2$ of the cover frame 120 and the radiation plate 140 are as thin as possible while maintaining sufficient rigidity and that the thermal conductivities $k_1$ and $k_2$ of the cover frame 120 and the radiation plate 140 are high. As a result, the heat transfer rate q of the present invention can be improved by using the radiation plate 140 formed of a copper-based material having a thermal conductivity $k_2$ which is higher than that of the conventional damper member 14 (see FIG. 1).

Table 1 shows the thermal conductivity of the radiation plate 140 when various alloys other than pure copper are used.

TABLE 1

| Classification | Configuration/material of radiation plate | Thermal conductivity (W/mk) |
|---|---|---|
| 1st embodiment | Cu with Ni coating over 0.01 mm | 370 |
| 2nd embodiment | Cu of 70% - Zn of 30% | 110 |

TABLE 1-continued

| Classification | Configuration/material of radiation plate | Thermal conductivity (W/mk) |
|---|---|---|
| 3rd embodiment | Cu of 89% - Sn of 11% | 54 |
| 4th embodiment | Cu of 90% - Al of 10% | 52 |
| Comparative example (the conventional art) | Stainless steel-based material | 15 |

As can be seen in Table 1, the thermal conductivity of the radiation plate 140 formed of each of the various alloys, instead of pure copper, is higher than the damper member 14 (see FIG. 1) formed of the conventional stainless-based material.

Thus, the radiation plate 140 formed of an alloy can prevent corrosion thereof and prevent an increase in the temperature inside the housing 100 due to increased thermal conductivity q, so that the data recorded on the hard disk 150 can be prevented from being damaged and a functional error of the apparatus can also be prevented.

While the preferred embodiments of the present invention have been described using specific terms, such description is for illustrative purposes only, and it is understood that changes and variations may be made by one skilled in the art without deviating from the broad principles and teachings of the present invention which shall be limited solely by the scope of the claims appended hereto.

What is claimed is:

1. A radiation apparatus of a hard disk drive comprising:
   a base frame;
   a spindle motor attached to said base frame and having a rotation shaft;
   a hard disk rotatably supported by said rotation shaft;
   a cover frame coupled to said base frame and having an opening formed therein;
   a radiation plate attached to said cover frame and formed of a copper alloy having a thermal conductivity higher than the thermal conductivity of said cover frame; and
   means for coupling said rotation shaft and said radiation plate so that driving heat generated by said spindle motor is directly transferred to said radiation plate,
   wherein said coupling means comprises a screw which protrudes through the opening and is threadably engaged with a screw hole in an end portion of said rotation shaft.

2. The radiation apparatus as claimed in claim 1, wherein a surface of said radiation plate is coated with nickel.

3. The radiation apparatus as claimed in claim 1, wherein a surface of said radiation plate is coated with nickel.

4. A radiation apparatus of a computer drive mechanism comprising:
   a base frame;
   a spindle motor attached to said base frame and having a rotation shaft;
   a computer readable medium rotatably supported by said rotation shaft;
   a cover frame coupled to said base frame and having an opening formed therein;

a radiation plate attached to said cover frame, and formed of a material having a thermal conductivity higher than the thermal conductivity of said cover frame, said rotation shaft being coupled with said radiation plate so that driving heat generated by said spindle motor can be directly transferred to said radiation plate, wherein said radiation plate is attached to said cover frame by a screw which is threadably engaged with a screw hole in an end portion of said rotation shaft.

5. The radiation apparatus as claimed in claim 4, wherein said radiation plate is made of a copper alloy.

6. The radiation apparatus as claimed in claim 4, wherein a surface of said radiation plate is coated with nickel.

7. The radiation apparatus as claimed in claim 4, wherein said cover frame is made of stainless steel.

* * * * *